United States Patent
Fu et al.

(10) Patent No.: US 12,183,323 B2
(45) Date of Patent: Dec. 31, 2024

(54) METHOD OF RECOGNIZING SPEECH OFFLINE, ELECTRONIC DEVICE, AND STORAGE MEDIUM

(71) Applicant: Beijing Baidu Netcom Science Technology Co., Ltd., Beijing (CN)

(72) Inventors: Xiaoyin Fu, Beijing (CN); Mingxin Liang, Beijing (CN); Zhijie Chen, Beijing (CN); Qiguang Zang, Beijing (CN); Zhengxiang Jiang, Beijing (CN); Liao Zhang, Beijing (CN); Qi Zhang, Beijing (CN); Lei Jia, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 184 days.

(21) Appl. No.: 17/644,749

(22) Filed: Dec. 16, 2021

(65) Prior Publication Data
US 2022/0108684 A1 Apr. 7, 2022

(30) Foreign Application Priority Data
Dec. 23, 2020 (CN) .......................... 202011535645.7

(51) Int. Cl.
*G10L 15/02* (2006.01)
*G10L 15/16* (2006.01)
*G10L 19/032* (2013.01)

(52) U.S. Cl.
CPC .............. *G10L 15/02* (2013.01); *G10L 15/16* (2013.01); *G10L 19/032* (2013.01); *G10L 2015/027* (2013.01)

(58) Field of Classification Search
CPC ....... G10L 15/02; G10L 15/16; G10L 19/032; G10L 2015/027; G10L 15/183; G10L 15/04; G10L 15/26
See application file for complete search history.

(56) References Cited

U.S. PATENT DOCUMENTS 10,854,193 B2 * 12/2020 Fu ........................... G10L 15/02
2015/0112674 A1 4/2015 Zhang et al.
(Continued)

FOREIGN PATENT DOCUMENTS

| CN | 109741752 | 5/2019 |
|---|---|---|
| CN | 110534095 | 12/2019 |

(Continued)

OTHER PUBLICATIONS

"A Breakthrough in Speech Technology: Baidu Launched SMLTA, the First Streaming Multi-layer Truncated Attention Model for Large-scale Online Speech Recognition", http://research.baidu.com/Blog/index-view?id=109 (Year: 2019).*
(Continued)

*Primary Examiner* — Daniel C Washburn
*Assistant Examiner* — Athar N Pasha
(74) *Attorney, Agent, or Firm* — HSML P.C.

(57) ABSTRACT

The present disclosure provides a method of recognizing speech offline, electronic device, and a storage medium, relating to a field of artificial intelligence such as speech recognition, natural language processing, and deep learning. The method may include: decoding speech data to be recognized into a syllable recognition result; transforming the syllable recognition result into a corresponding text as a speech recognition result of the speech data.

8 Claims, 6 Drawing Sheets

(56) References Cited

U.S. PATENT DOCUMENTS

| | | | |
|---|---|---|---|
| 2020/0294488 A1* | 9/2020 | Li | G06F 40/242 |
| 2021/0193161 A1* | 6/2021 | Delcroix | G10L 15/16 |
| 2021/0304769 A1* | 9/2021 | Ye | G10L 15/16 |
| 2022/0036155 A1* | 2/2022 | Guevara | G06N 3/063 |

FOREIGN PATENT DOCUMENTS

| | | |
|---|---|---|
| CN | 111415654 | 7/2020 |
| JP | 2012-068354 | 4/2012 |
| KR | 10-2019-0010607 | 1/2019 |
| KR | 10-2020-0086214 | 7/2020 |

OTHER PUBLICATIONS https://arxiv.org/abs/1912.03010 (Year: 2020).*

Chinese Office Action, issued in the corresponding Chinese application No. 202011535645.7, dated Apr. 20, 2021, 9 pages.

Zhou et al., "Syllable-Based Sequence-to-Sequence Speech Recognition with the Transformer in Mandarin Chinese", Institute of Automation, Chinese Academy of Sciences University of Chinese Academy of Sciences, Jun. 4, 2018, 5 pages.

Office Action issued in corresponding Korean Patent Application No. 10-2021-0126603, Jul. 10, 2024, 14 pages w/translation.

* cited by examiner

METHOD OF RECOGNIZING SPEECH OFFLINE, ELECTRONIC DEVICE, AND STORAGE MEDIUM

CROSS-REFERENCE TO RELATED APPLICATIONS

This application is claims priority to Chinese Application No. 202011535645.7, filed on Dec. 23, 2020, which is incorporated herein by reference in its entirety.

TECHNICAL FIELD

The present disclosure relates to a field of artificial intelligent technology, and in particular, to fields of speech recognition, natural language processing and deep learning etc., and more particularly, to a method of recognizing speech offline, an electronic device, and a storage medium.

BACKGROUND

At present, speech recognition has been widely used in various scenarios such as speech input, speech dialing, car navigation, etc.

Speech recognitions generally include online speech recognition and offline speech recognition. The online speech recognition generally requires uploading speech data to a server through network in order to be decoded by the server. A performance of the speech recognition is seriously affected by a network quality, and due to the upload of the speech data is required, it is easy to cause personal information leakage. That is to say, the online speech recognition may not meet requirements of reliability and privacy.

The offline speech recognition does not require uploading the speech data to the server, instead, the speech data is decoded directly on a device, thereby meeting the requirements of reliability and privacy. However, due to limited computing and storage resources on a device side, it is generally necessary to limit a size of a cognition model, resulting in lower accuracy of a speech recognition result.

SUMMARY

A method of recognizing speech offline, an electronic device, and a storage medium are provided according to embodiments of the present disclosure.

In an aspect, there is provided a method of recognizing speech offline, including:
  decoding speech data to be recognized into a syllable recognition result;
  transforming the syllable recognition result into a corresponding text as a speech recognition result of the speech data.

In another aspect, there is provided an electronic device, including:
  at least one processor; and
  a memory communicatively connected to the at least one processor;
  wherein the memory stores instructions executable by the at least one processor, the instructions, when executed by the at least one processor, cause the at least one processor to perform the method described above.

In another aspect, there is provided a non-instant computer readable storage medium storing computer instruction, wherein the computer instructions are configured to cause a computer to perform the method described above.

It should be understood that, the content described in the part is not intended to indicate key or important features of the embodiments of the present disclosure, and is not used to limit the scope of the present disclosure. Other features of the present disclosure will become easier to understand through the following specification.

BRIEF DESCRIPTION OF THE DRAWINGS

The accompanying drawings are used to better understand the present disclosure, and do not limit the present disclosure. Among them.

DETAILED DESCRIPTION OF EMBODIMENTS

In the following, exemplary embodiments of the present disclosure will be described with reference to the drawings, various details of the present disclosure are included here so as to facilitate understanding, and it should be noted that they are merely illustrative. Therefore, those of ordinary skill in the art should note that, various changes and modifications may be made to the embodiments described here without departing from the scope and the spirit of the present disclosure. Also, for clarity and explicitness, descriptions of well-known functions and structures are omitted below.

In addition, it should be understood that the terms "and/or" used herein is merely an associated relationship of describing associated objects, and it may represent three relationships, for example, A and/or B may represent: merely A, both A and B, merely B. in addition, the character "/" used herein generally represents the associated objects before and after are in an "or" relationship.

Figure 1:
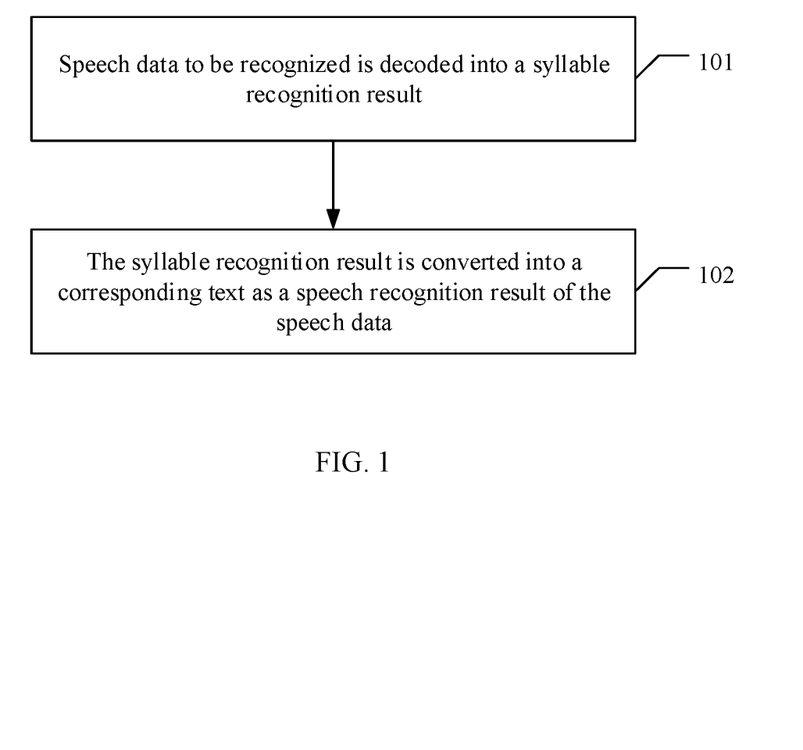
FIG. 1 is a flowchart of the method of recognizing speech offline according to the embodiments of the present disclosure.

FIG. 1 is a flowchart of the method of recognizing speech offline according to the embodiments of the present disclosure. As shown in FIG. 1, the method may be implemented as following.

In step 101, speech data to be recognized is decoded into a syllable recognition result.

In step 102, the syllable recognition result is transformed into a corresponding text as a speech recognition result of the speech data.

It can be seen that according to the embodiments of the present disclosure, it is proposed to recognize speech offline by two stages based on syllable, in which the process of offline speech recognition is divided into two stages. First, a context-independent syllable is used as a basic acoustic modeling unit, to decode the speech data to be recognized, and the speech recognition result is obtained. After that, in order to meet readability of the recognition result, the syllable recognition result is transformed into the corresponding text, so as to obtain the required speech recognition result. In this manner, an accuracy of the speech recognition result, etc. may be ensured without increasing an occupation of computing and storage resources, etc.

In decoding the speech data to be recognized is decoded into the syllable recognition result, specifically a syllable decoder may be used to decode the speech data, so as to obtain the syllable recognition result. The syllable decoder is used to decode the speech data with a syllable-based acoustic model and a syllable-based language model.

In some embodiments, the acoustic model may be an end-to-end streaming multi-layer truncated attention (SMLTA) model, and/or the language model may be a long short term memory (LSTM) language model.

Figure 2:
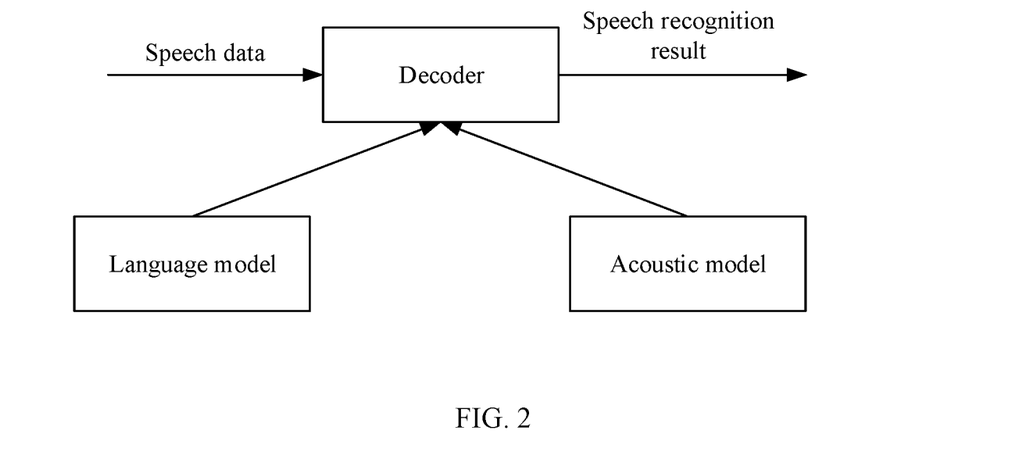
FIG. 2 is a schematic diagram of a method of recognizing speech offline.

An offline speech recognition system generally includes three parts: an acoustic model, a language model and a decoder. As shown in FIG. 2, FIG. 2 is a schematic diagram of a method of recognizing speech offline, in which the decoder is used to decode speech data input based on the language model and the acoustic model, so as to obtain a speech recognition result. Considering limited computing and storage resources on a device side, the language model may be tailored through a method based on relative entropy, to obtain an n-gram language model. A volume of the n-gram language model is generally controlled to be about tens of Megabytes, which is reduced by about 1000 times compared to the volume of the language model at a server end in the online speech recognition. Greatly tailoring the volume of the language model may cause great decrease in the accuracy of the speech recognition result. In addition, when the n-gram language model is used in recognition, a decoding path needs to be expanded. Since one pronunciation may correspond to a plurality of potential texts candidate recognition results need to be tailored in order to meet the requirements of the computing resource of an embedded device. However, the correct recognition result is easy to be tailored in advance, leading to a recognition error and thus further reducing the accuracy of the speech recognition result, etc.

In the method of recognizing speech offline of embodiments of the present disclosure, the n-gram language model is replaced with a syllable-based neural network language model, avoiding problems caused by tailoring while effectively reducing the volume of the model, thereby improving the accuracy of the speech recognition result, etc.

In addition, by using the syllable-based neural network language model, the syllable recognition result is directly output when decoding, so that the syllable recognition result is transformed into the corresponding text without the need of transforming the pronunciation to the text. In this manner, a search space of the decoder may be greatly reduced, making the method being particularly suitable for scenarios where the offline speech recognition decoding resource is limited while a performance of the offline speech recognition being effectively ensured, etc.

As described above, the acoustic model used in the method of recognizing speech offline of the present disclosure may be the syllable-based end-to-end SMLTA model.

Figure 3:
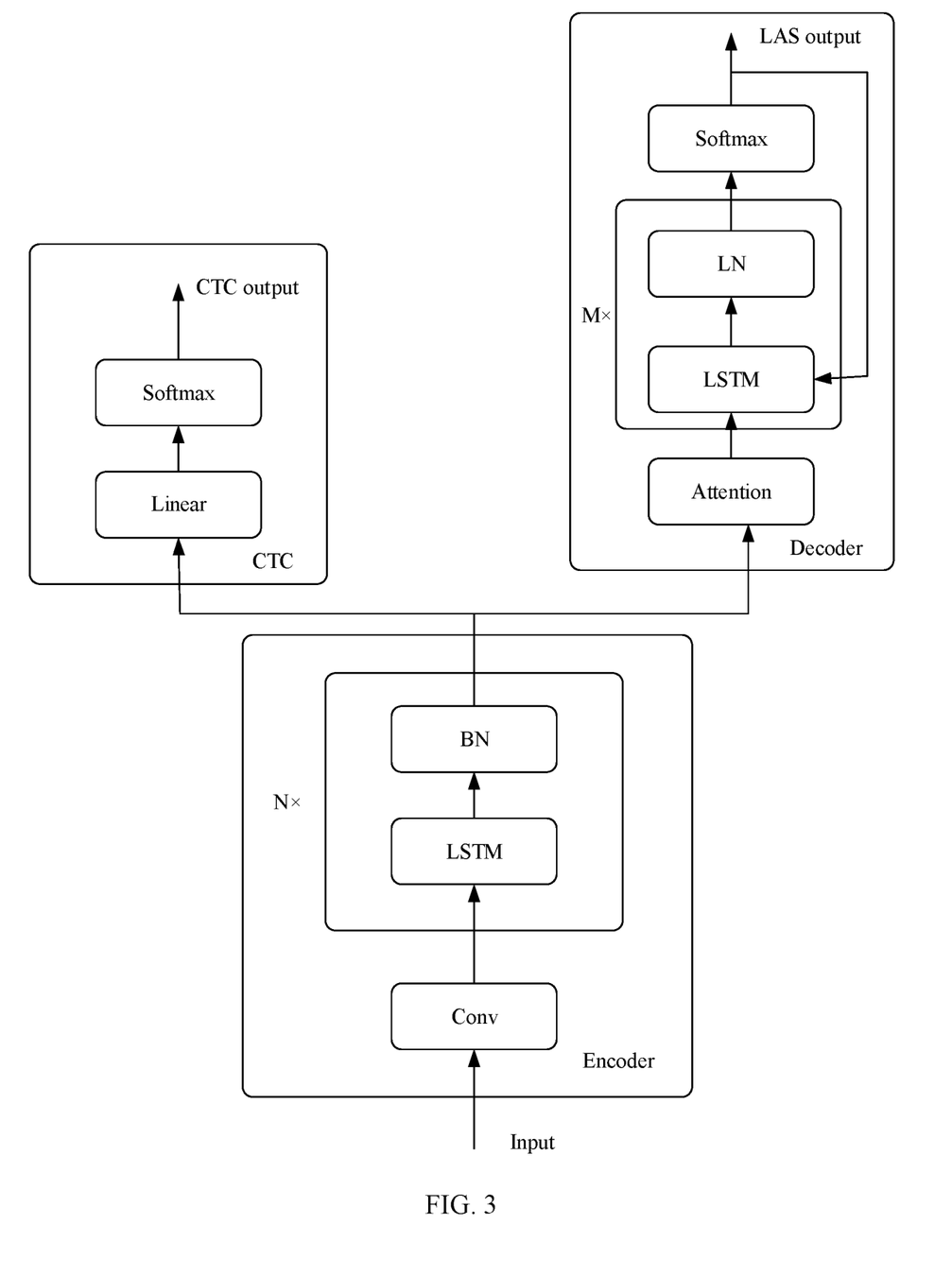
FIG. 3 is a schematic structural diagram of a syllable-based end-to-end SMLTA model of the present disclosure.

FIG. 3 is a schematic structural diagram of a syllable-based end-to-end SMLTA model of the present disclosure. As shown in FIG. 3, the model mainly includes three parts: an encoder, a connectionist temporal classification (CTC) and a decoder. The decoder may be a listen, attend and spell (LAS) decoder.

Among them, the encoder may include a convolution (Cony) layer and N LSTM+BN (Batch Normalize) layers, a specific value of N may be determined according to actual needs, for example, it may be 5. CTC may include a linear transformation (Linear) layer and a normalize (Softmax) layer. The LAS decoder may include an attention layer, M LSTM+LN (Layer Normalize) layer and a Softmax layer, a specific value of M may also be determined according to actual needs, for example, it may be 2.

An input of the SMLTA model shown in FIG. 3 may be feature data extracted from the speech data, and an output of the model may include a CTC output and a LAS output. Both of the CTC output and the LAS output may be provided to the syllable decoder, so that the syllable decoder may obtain the syllable recognition result through decoding based on the two output results in combination with the language model, etc.

In order to improve a processing efficiency, etc., each of the LSTMs in the encoder and the decoder shown in FIG. 3 may be a one-way LSTM. In addition, the SMLTA model shown in FIG. 3 may be a light-SMLTA model having a low frame rate, further reducing a computing amount of the acoustic model, etc. while improving the processing efficiency.

As described above, the language model used in the method of recognizing speech offline of the present disclosure may be a syllable-based LSTM language model.

Figure 4:
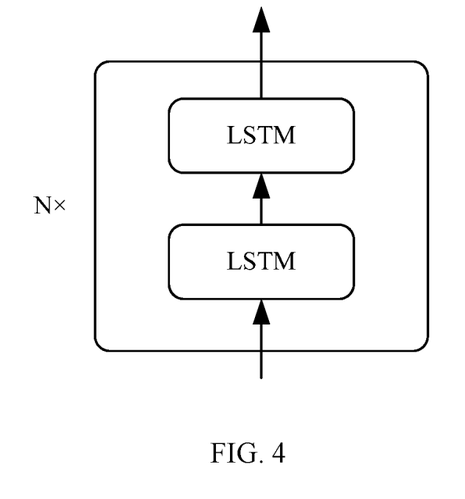
FIG. 4 is a schematic structural diagram of a syllable-based LSTM language model of the present disclosure.

FIG. 4 is a schematic structural diagram of a syllable-based LSTM language model of the present disclosure. As shown in FIG. 4, N LSTM+LSTM layers may be included, and a specific value of N may be determined according as desired in practice. The two LSTMs may be the same, or may be different, for example, parameter configurations of the two LSTMs are different.

In addition, the volume of the LSTM language model may be compressed through 4-bit quantization, so as to further reduce the volume of the LSTM language model. The volume of the model compressed through 4-bit quantization is only ⅛ of a volume of a conventional language model with a 32-bit storage structure. The 4-bit quantization may be implemented in any proper manner as desired, and will not be described in detail here.

Since the output of the syllable decoder is the syllable recognition result, i.e. a syllable sequence which is difficult to be recognized by ordinary users, it is desired to transform the syllable recognition result into the corresponding text, i.e. transform the syllable sequence into a corresponding text sequence, in order to meet the readability of the recognition result.

Specifically, a syllable transformer model, such as a streaming transformer model may be used, to transform the syllable recognition result into the corresponding text.

Figure 5:
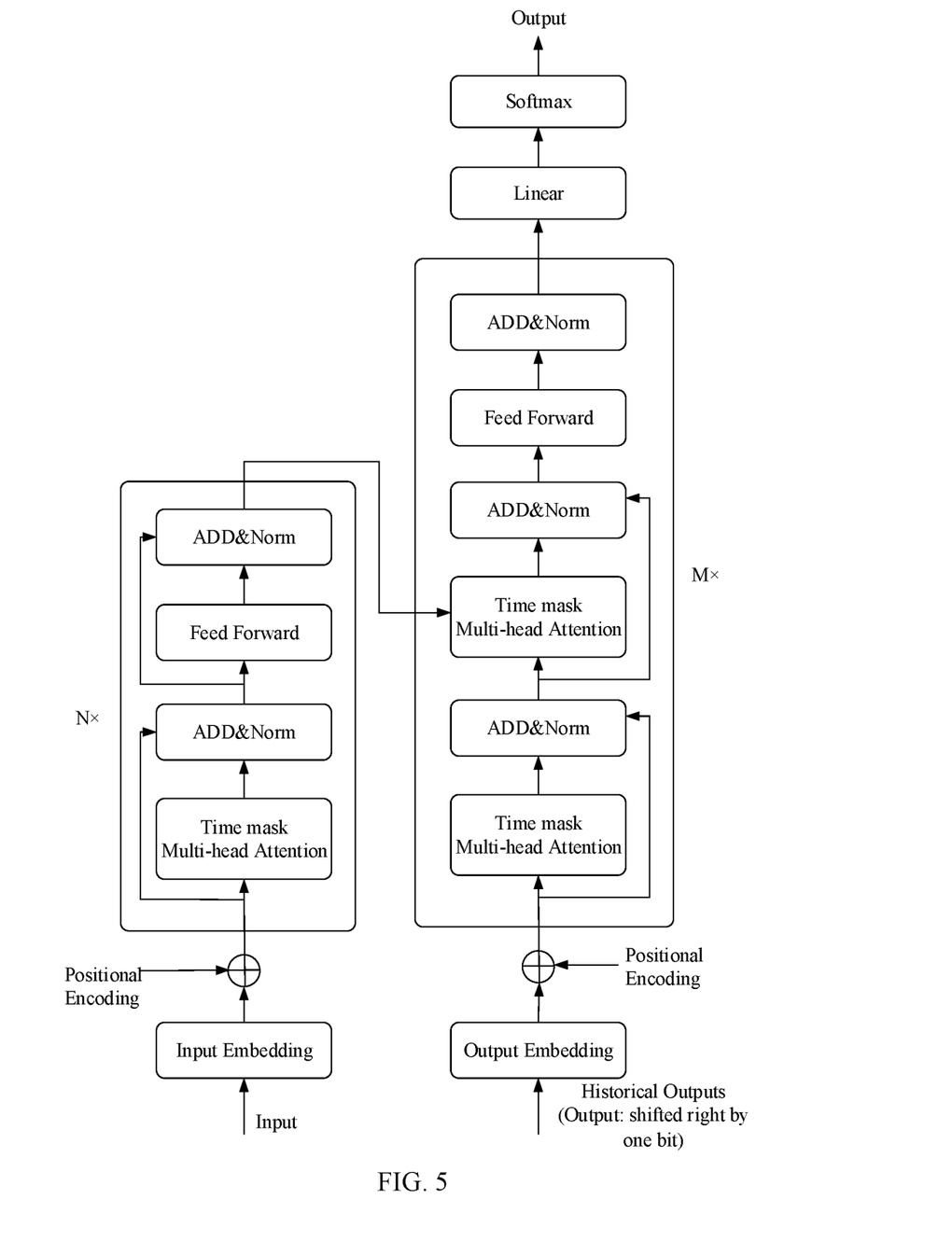
FIG. 5 is a schematic structural diagram of a streaming transformer model of the present disclosure.

FIG. 5 is a schematic structural diagram of a streaming transformer model of the present disclosure. As shown in FIG. 5, the streaming transformer model of the present disclosure has a structure similar to a structure of a standard transformer model, i.e. include a structure of encoder+decoder, and performs a specific processing method as follows. Feature transformation is performed on the syllable recognition result through input embedding and positional encoding, and then feature encoding is performed on the syllable recognition result by using N-layer cascaded attention modules and residual modules of the encoder. Likewise, output embedding and positional encoding are performed on the historical output result by the decoder, and an output result is obtained by using M-layer cascaded attention modules and residual modules in combination with the historical output result and the feature encoding output by the encoder, etc. . . . Specific values of N and M may be determined as desired in practice.

As shown in FIG. 5, unlike the standard transformer model, a time mask operation is added into each attention structure in the streaming transformer model of the present disclosure, so as to achieve streaming syllable transformation by using the time mask operation, thereby achieving a function of streaming output of the decoding result.

Figure 6:
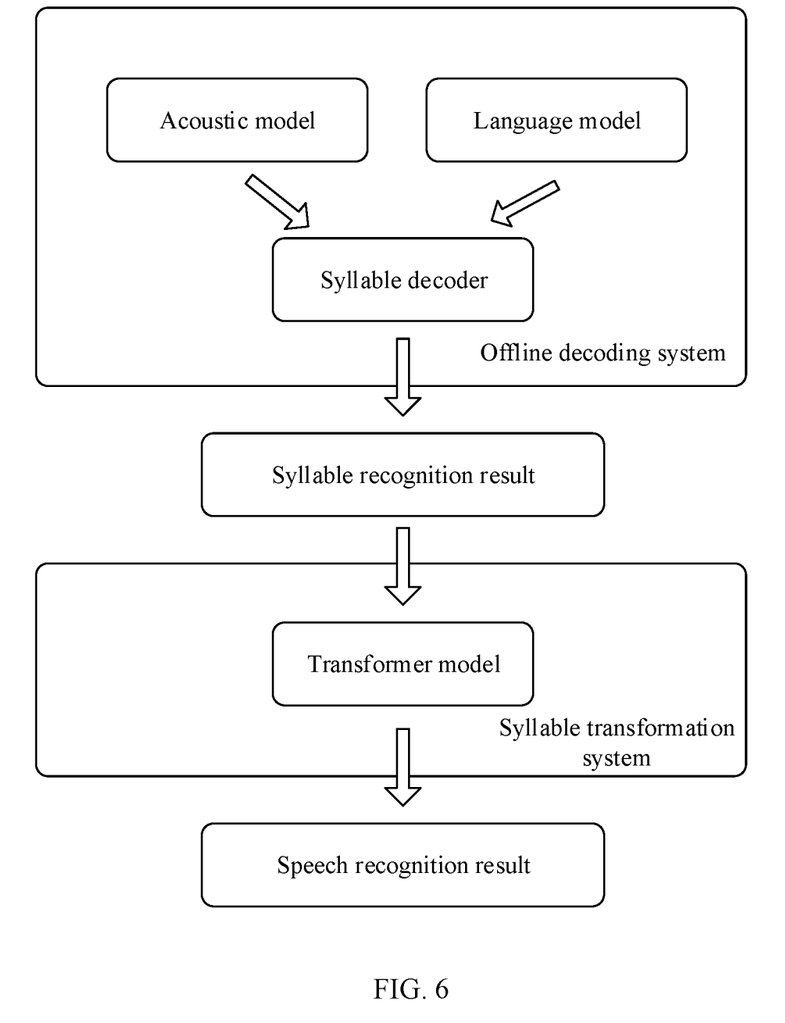
FIG. 6 is a schematic diagram of an implementation process of offline speech recognition of the present disclosure.

Based on the descriptions above, FIG. 6 is a schematic diagram of an implementation process of the method of recognizing speech offline of the present disclosure.

As shown in FIG. 6, an offline speech recognition system includes an offline decoding system and a syllable transformation system. For the speech data to be recognized, firstly the speech data is decoded by the syllable decoder in the offline decoding system with the syllable-based acoustic model and the syllable-based language model, so as to obtain the syllable recognition result.

The syllable decoder may be a Chinese and/or English syllable decoder based on the neural network (NN) language model. The acoustic model may be the low frame rate end-to-end SMLTA model. The language model may be the LSTM model. In addition, the volume of the model of the LSTM language model may be compressed through 4-bit quantization.

As shown in FIG. 6, for the syllable recognition result output by the offline decoding system, the streaming transformer model in the syllable transformation system may be used to transform the syllable recognition result into the corresponding text, so as to obtain speech recognition result of the speech data to be recognized.

It should be noted that, in the above-mentioned method embodiments, for ease of description, the method is described as a combination of a series of operation. However, those skilled in the art should understand that the present disclosure is not limited by the sequence of the described operation, because according to the present disclosure, some steps may be operated in other sequences, or may be performed simultaneously. Also, those skilled in the art should understand that the embodiments described in the specification are all preferable embodiments, and the operations and modules involved are not necessary in the present disclosure.

The method embodiments have been described above, in the following, the solution of the present disclosure is further described through apparatus embodiments.

Figure 7:
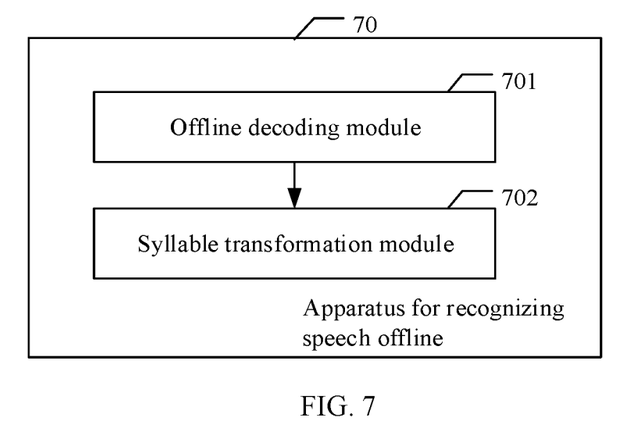
FIG. 7 is a schematic diagram of an apparatus for recognizing speech offline 70 according to the embodiments of the present disclosure.

FIG. 7 is a schematic structural diagram of an apparatus for recognizing speech offline 70 according to the embodiments of the present disclosure. As shown in FIG. 7, the apparatus includes: an offline decoding module 701 and a syllable transformation module 702.

The offline decoding module 701 is used to decode the speech data to be recognized into the syllable recognition result.

The syllable transformation module 702 is used to transform the syllable recognition result into the corresponding text as the speech recognition result of the speech data.

In decoding the speech data to be recognized into the syllable recognition result, specifically the offline decoding module 701 may use the syllable decoder to decode the speech data, so as to obtain the syllable recognition result. The syllable decoder is used to decode the speech data with the syllable-based acoustic model and the syllable-based language model.

In some embodiments, the acoustic model may be the end-to-end SMLTA model, and/or the language model may be the LSTM language model.

The SMLTA model may be the low frame rate SMLTA model. In addition, the offline decoding module 701 compress the volume of the LSTM language model through 4-bit quantization, so as to further reduce the volume of the LSTM language model.

Since the output of the syllable decoder is the syllable recognition result, i.e., a syllable sequence which is not recognized by ordinary users, it is desired to transform the syllable recognition result into the corresponding text, i.e. transform the syllable sequence into the corresponding text sequence, in order to meet the readability of the recognition result.

Specifically, the syllable transformation model 702 may transform the syllable recognition result into the corresponding text by using the streaming transformer model.

The structure of the streaming transformer model is similar to the structure of the standard transformer except that in the syllable transformation module 702, the time mask operation is added into each attention structure in the streaming transformer model, so as to achieve streaming syllable transformation by using the time mask operation.

Specific operating process of the apparatus according to the embodiment as shown in FIG. 7 may be found with reference to the relevant description in the method of the embodiments described above, and will not be repeated here.

In view of the above, with the apparatus according to the embodiment of the present disclosure, it is proposed to recognize speech offline by two stages based on syllable. The process of offline speech recognition is divided into two stages. First, a context-independent syllable is used as a basic acoustic modeling unit to decode speech data to be recognized, so as to obtain a speech recognition result. Then, in order to meet readability of the recognition result, the syllable recognition result is transformed into a corresponding text, so as to obtain the required speech recognition result. In this manner, an accuracy of the speech recognition result, etc. may be ensured without increasing an occupation of computing and storage resources, etc.

The solution of the present disclosure may be applied in the field of artificial intelligence, and in particular to the fields of speech recognition, natural language processing and deep learning, etc.

Artificial intelligence is the subject of studying to control computers to simulate certain thought processes and intelligent behaviors (such as learning, reasoning, thinking, planning, etc.) of humans. It requires technologies of both hardware-level and software-level. The artificial intelligence hardware technologies generally include sensors, dedicated artificial intelligence chips, cloud computing, distributed storage, big data processing, etc. the artificial intelligence software technologies mainly include several directions such as computer vision technology, speech recognition technology, natural language processing technology, machine learning/deep learning, bid data processing technology, knowledge graph technology, etc. . . .

Collecting, storing, using, processing, transmitting, providing, and disclosing etc. of the personal information of the user involved in the present disclosure all comply with the relevant laws and regulations, and do not violate the public order and morals.

According to the embodiments of the present disclosure, the present disclosure further provides an electronic device, a readable storage medium and a computer program product.

Figure 8:
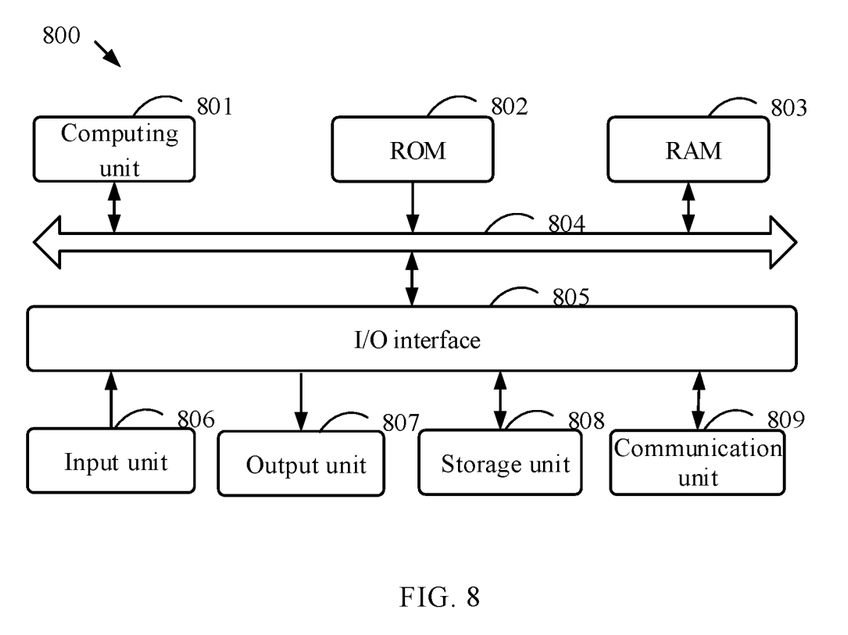
FIG. 8 shows a schematic block diagram of an exemplary electronic device 800 for implementing the embodiments of the present disclosure.

FIG. 8 illustrates a schematic block diagram of an exemplary electronic device 800 for implementing the embodiments of the present disclosure. The electronic device is intended to represent various forms of digital computers, for example, laptop computers, desktop computers, workstations, servers, blade servers, mainframe computers, and other suitable computers. The electronic device may also represent various forms of mobile devices, for example, personal digital processing, cellular phones, smart phones, wearable devices, and other similar computing devices. The components, their connections and relationships, and their functions shown herein are merely examples, and are not intended to limit the implementation of the present disclosure described and/or required herein.

As shown in FIG. 8, the device 800 includes a computing unit 801, the computing unit may perform various suitable operations and processing according to computer programs stored in a ROM 802 or computer programs loaded from a storage unit 808 to a RAM 803. In the RAM 803, various programs and date needed for the operation of the device 800 may also be stored. The computing unit 801, ROM 802 and RAM 803 are connected to each other through a bus 804. An input/output (I/O) interface 805 is also connected to the bus 804.

A plurality of components in the device 800 are connected to the I/O interface 805, including: an input unit 806 such as a keyboard, a mouth, etc.; an output unit 807 such as a display of various types, a loudspeaker, etc.; a storage unit 808 such as a disk, an optical disk, etc.; and a communication unit 809 such as a network card, a modem, a wireless communication transceiver, etc. The communication unit 809 allows the device 800 to exchange information/date with other devices through a computer network such as Internet and/or various telecommunication networks.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processing DSP, and any appropriate processor, controller, microcontroller, etc. The computing unit 801 performs the various methods and processing described above, for example, the method of the present disclosure. For example, in some embodiments, the method of the present disclosure may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded onto the RAM 803 and executed by the computing unit 801, one or more steps of the method of the present disclosure may be performed. Alternatively, in other embodiments, the computing unit 801 may be configured to perform the method of the present disclosure in any other suitable manner (for example, by means of firmware).

Various implementations of the systems and technologies described above in this article may be implemented in a digital electronic circuit system, an integrated circuit system, a field programmable gate array (FPGA), an application specific integrated circuit (ASIC), an application-specific standard product (ASSP), a system on chip (SOC) system, a load programmable logic device (CPLD), a computer hardware, a firmware, a software, and/or a combination thereof. These various embodiments may include: being implemented in one or more computer programs, the one or more computer programs may be executed and/or interpreted on a programmable system including at least one programmable processor, the programmable processor may be a dedicated or general-purpose programmable processor that may receive data and instructions from a storage system, at least one input device, and at least one output device, and may transmit the data and instructions to the storage system, the at least one input device, and the at least one output device.

The program codes used to implement the method of the present disclosure may be written in any combination of one or more programming languages. These program codes may be provided to processors or controllers of general-purpose computers, special-purpose computers, or other programmable data processing devices, so that when the program codes are executed by the processors or controllers, functions/operations specified in the flowcharts and/or block diagrams are implemented. The program codes may be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store programs for being used by an instruction execution system, device, or apparatus or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of the machine-readable storage medium would include electrical connections based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the foregoing.

In order to provide interaction with the user, the system and technology described here may be implemented on a computer that has: a display device for displaying information to the user (for example, a CRT (cathode ray tube) or an LCD (liquid crystal display) monitor); and a keyboard and pointing device (for example, a mouse or a trackball) through which the user may provide input to the computer. Other types of devices may also be used to provide interaction with the user; for example, the feedback provided to the user may be sensory feedback of any form (for example, visual feedback, auditory feedback, or tactile feedback); and may receive input from the user in any form (including acoustic input, voice input, or tactile input).

The systems and technologies described here may be implemented in a computing system that includes back-end components (for example, as a data server), or a computing system that includes middleware components (for example, an application server), or a computing system that includes front-end components (For example, a user computer with a graphical user interface or a web browser through which the user may interact with the implementation of the system and technology described herein), or a computing system including any combination of the back-end components, the middleware components, or the front-end components. The components of the system may be connected to each other through digital data communication (for example, communication network) in any form or medium. Examples of the communication networks include: local area network (LAN), wide area network (WAN), and the Internet.

A computer system may include a client and a server. The client and server are generally far away from each other and interact through a communication network. A relationship between the client and the server is generated by running computer programs that have a client-server relationship with each other on corresponding computers. The server may be a cloud server, which may also be referred to as a cloud computing server or a cloud host, and it is a host product in the cloud computing service system, so as to solve defects of difficult management and poor business expansion in conventional physical hosts and virtual private servers (VPS). The server may also be a server of a distributed system, or a server combined with a blockchain.

It should be understood that the various forms of processes shown above may be used to reorder, add or delete steps. For example, the steps described in the present disclosure may be performed in parallel, sequentially, or in different orders, as long as the desired result of the technical solution disclosed in the present disclosure may be achieved, which is not limited herein.

The above specific embodiments do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method of recognizing speech offline, comprising:
   generating a connectionist temporal classification (CTC) output and a listen, attend and spell (LAS) output by using an acoustic model based on feature data extracted from speech data;
   decoding the speech data by using a syllable decoder based on the CTC output and the LAS output in combination with a language model, to obtain a syllable recognition result; and
   transforming the syllable recognition result into the corresponding text as a speech recognition result of the speech data by using a streaming transformer model;
   wherein the acoustic model comprises an encoder, a CTC module and a decoder, the encoder comprises a convolution layer, a first long short term memory (LSTM) layer and a batch normalize (BN) layer, the CTC module comprises a linear layer and a first softmax layer, the decoder is an LAS decoder, and the decoder comprises an attention layer, a second LSTM layer, a layer normalize (LN) layer and a second softmax layer; and
   wherein the language model comprises a third LSTM and a fourth LSTM layer.

2. The method of claim 1, further comprising:
   compressing a volume of the LSTM language model through 4-bit quantization.

3. The method of claim 1, wherein the using a streaming transformer model to transform the syllable recognition result into the corresponding text comprises:
   adding a time mask operation to each attention structure in the transformer model, and implementing a streaming syllable transformation through the time mask operation.

4. An electronic device, comprising:
   at least one processor; and
   a memory communicatively connected to the at least one processor;
   wherein the memory stores instructions executable by the at least one processor, and the instructions, when executed by the at least one processor, cause the at least one processor to perform the method of claim 1.

5. The electronic device of claim 4, wherein the at least one processor is further configured to:
   compress a volume of the LSTM language model through 4-bit quantization.

6. The electronic device of claim 4, wherein the at least one processor is further configured to:
   add a time mask operation to each attention structure in the transformer model, and implementing a streaming syllable transformation through the time mask operation.

7. A non-transitory computer readable storage medium storing computer instructions, wherein the computer instructions are configured to cause a computer to perform the method of claim 1.

8. The non-transitory computer readable storage medium of claim 7, wherein the computer instructions are configured to cause a computer to:
   compress a volume of the LSTM language model through 4-bit quantization.

* * * * *